United States Patent [19]
Weidner et al.

[11] Patent Number: 6,034,225
[45] Date of Patent: Mar. 7, 2000

[54] ORGANOPOLYSILOXANES HAVING ALIPHATICALLY UNSATURATED RADICALS, THE PREPARATION THEREOF AND THE USE THEREOF IN CROSSLINKABLE MATERIALS

[75] Inventors: Richard Weidner, Burghausen; Friedrich Hockemeyer, Markl, both of Germany

[73] Assignee: Wacker-Chemie GmbH, Munich, Germany

[21] Appl. No.: 09/091,529

[22] PCT Filed: Dec. 19, 1996

[86] PCT No.: PCT/EP96/05721

§ 371 Date: Jun. 19, 1998

§ 102(e) Date: Jun. 19, 1998

[87] PCT Pub. No.: WO97/23548

PCT Pub. Date: Jul. 3, 1997

[30] Foreign Application Priority Data

Dec. 22, 1995 [DE] Germany ............... 195 48 474

[51] Int. Cl.$^7$ .................................. C08K 5/54
[52] U.S. Cl. ............ 534/730; 524/848; 524/862; 525/478; 528/15; 528/32; 528/35
[58] Field of Search .................. 528/32, 15, 35; 525/478; 524/730, 848, 862

[56] References Cited

U.S. PATENT DOCUMENTS

| 4,772,515 | 9/1988 | Hara et al. . | |
| 4,871,827 | 10/1989 | Klosowski et al. | 528/35 |
| 5,077,369 | 12/1991 | DeMontigny et al. . | |
| 5,247,046 | 9/1993 | Takago et al. | 528/35 |

FOREIGN PATENT DOCUMENTS

| 0403890 | 6/1990 | European Pat. Off. . |
| 0640662 | 8/1994 | European Pat. Off. . |
| 9301201 | 11/1993 | WIPO . |

OTHER PUBLICATIONS

For German Patent Appl. P 4436817.8 the corresponding.

*Primary Examiner*—Melvyn I. Marquis
*Attorney, Agent, or Firm*—Brooks & Kushman P.C.

[57] ABSTRACT

The invention relates to organopolysiloxanes which have aliphatically unsaturated radicals, are soluble to at least 80 wt % in organic solvents selected from xylene and toluol at a temperature of 25° C. and a pressure of from 900 to 1100 hPa and contain at least one unit of the following formula (I) $R^1_a R_{2-a} SiO_{2/2}$, at least one unit of the following formula (II) $R^1_b R_{3-b} SiO_{1/2}$, at least one unit of the following formula (III) $O_{1/2} R_2 SiO_x YRSiO_{2/2}$, and optionally at least one unit of the following formula (IV) $O_{1/2} R_2 SiO_x YR_2 SiO_{1/2}$, in which:

R can be identical or different and is a monovalent, substituted or unsubstituted, SiC-bonded, aliphatically saturated hydrocarbon radical.

$R^1$ can be identical or different and is a monovalent, SiC-bonded, substituted or unsubstituted, aliphatically unsaturated hydrocarbon radical, a is 0, 1 or 2, b is 0, 1, 2 or 3, x is 0 or 1 and y is a radical —$(CR^3_2)_n CHR^3$— with at least two carbon atoms, where n is 0 or an integer from 1 to 3 and $R^3$ is a hydrogen atom or is as defined for R, with the proviso that the organopolysiloxane includes at least one unit of the formula (II) where b is not 0. It also relates to the preparation of the organopolysiloxanes and the use thereof in crosslinkable materials.

11 Claims, No Drawings

ORGANOPOLYSILOXANES HAVING ALIPHATICALLY UNSATURATED RADICALS, THE PREPARATION THEREOF AND THE USE THEREOF IN CROSSLINKABLE MATERIALS

TECHNICAL FIELD

The invention relates to organopolysiloxanes which contain aliphatically unsaturated radicals and are soluble in organic solvents, to processes for their preparation and to their use in crosslinkable organopolysiloxane compositions, especially for producing adhesive-repellent organopolysiloxane films.

BACKGROUND OF THE INVENTION

EP 0403890 B1 (Bayer AG; published on Mar. 16, 1994) or the corresponding U.S. Pat. No. 5,077,369, and EP 0640662 A2 (Bayer AG; published on Mar. 1, 1995), describe addition-crosslinking organopolysiloxane mixtures for producing adhesion-reducing coatings. The organopolysiloxanes present in the mixtures are branched, with the branching sites being constituted by trifunctional monoorganosiloxy groups, so-called T units, or tetrafunctional siloxy groups, so-called Q units, and the organopolysiloxanes described have at least 12 T units per molecule. Moreover, they possess triorganosiloxy groups, so-called M units, some of which are free from unsaturated radicals while the remainder carry only one unsaturated radical each. The organopolysiloxanes are prepared by hydrolyzing chlorosilanes and then carrying out polymerization with low molecular mass cyclic diorganopolysiloxanes. U.S. Pat. No. 4,772,515 (Shin-Etsu Chemical Co.; published on Sep. 20, 1988) likewise claims addition-crosslinking organopolysiloxane mixtures for producing adhesive-repellent organopolysiloxane coatings. The organopolysiloxanes present have at least two branching sites per molecule, in the form of T units, and each terminal Si atom possesses at least one unsaturated group. The organopolysiloxanes are prepared by reacting alkyltrimethoxysilanes with octamethylcyclotetrasiloxane in the presence of a basic catalyst, followed by hydrolysis and reaction with alkenyldisiloxanes.

SUMMARY OF THE INVENTION

The invention provides organopolysiloxanes containing aliphatically unsaturated radicals, which are soluble in organic solvents selected from the group consisting of xylenes and toluene to an extent of at least 80 percent by weight, preferably 90 percent by weight, particularly preferably 100 percent by weight, at a temperature of 25° C. and a pressure of from 900 to 1100 hPa, and comprise at least one unit of the formula $$R^1_a R_{2-a} SiO_{2/2} \quad (I),$$

at least one unit of the formula $$R^1_b R_{3-b} SiO_{1/2} \quad (II),$$

at least one unit of the formula $$O_{1/2} R_2 SiO_x YRSiO_{2/2} \quad (III)$$

and, if desired, at least one unit of the formula $$O_{1/2} R_2 SiO_x YR_2 SiO_{1/2} \quad (IV),$$

where

R can be identical or different and is a monovalent, substituted or unsubstituted, SiC-bonded, aliphatically saturated hydrocarbon radical, $R^1$ can be identical or different and is a monovalent, SiC-bonded, substituted or unsubstituted, aliphatically unsaturated hydrocarbon radical, a is 0, 1 or 2, preferably 0, b is 0, 1, 2 or 3, preferably 0 or 1, x is 0 or 1, preferably 0, and Y is a radical —$(CR^3_2)_n CHR^3$— with at least two carbon atoms, where n is 0 or an integer from 1 to 3, particularly preferably 0 or 1, and $R^3$ is a hydrogen atom or is as defined for R, with the proviso that the organopolysiloxane includes at least one unit of the formula (II) where b is not 0.

In addition to the units of the formula (I), (II), (III) and if appropriate (IV) the novel organopolysiloxanes may have further siloxane units, for example those of the formula $O_{2/2} RSiO_x YRSiO_{2/2}$ and $O_{2/2} RSiO_x YR_2 SiO_{1/2}$, although this is not preferred.

DESCRIPTION OF THE PREFERRED EMBODIMENTS

The term organopolysiloxanes is intended in the context of the present invention to embrace not only polymeric but also dimeric and oligomeric siloxanes.

The novel organopolysiloxanes preferably include at least two units of the formula (II) where b=1.

The radical R preferably comprises substituted or unsubstituted, monovalent, SiC-bonded, aliphatically saturated hydrocarbon radicals having 1 to 18 carbon atoms.

Examples of each radical R are alkyl radicals such as the methyl, ethyl, n-propyl, isopropyl, n-butyl, isobutyl, tert-butyl, n-pentyl, isopentyl, neopentyl and the tert-pentyl radicals, hexyl radicals, such as the n-hexyl radical, heptyl radicals, such as the n-heptyl radical, octyl radicals, such as the n-octyl radical and isooctyl radicals, such as the 2,2,4-trimethylpentyl and the 2-ethylhexyl radical, nonyl radicals, such as the n-nonyl radical, decyl radicals, such as the n-decyl radical, dodecyl radicals, such as the n-dodecyl radical, tetradecyl radicals, such as the n-tetradecyl radical, hexadecyl radicals, such as the n-hexadecyl radical, and octadecyl radicals, such as the n-octadecyl radical, cycloalkyl radicals, such as cyclopentyl, cyclohexyl and 4-ethylcyclohexyl radical, cycloheptyl radicals, norbornyl radicals and methylcyclohexyl radicals, aryl radicals, such as the phenyl, biphenyl, naphthyl and anthryl and phenanthryl radical; alkaryl radicals, such as o-, m-, p-tolyl radicals, xylyl radicals and ethylphenyl radicals; aralkyl radicals, such as the benzyl radical, and also the α- and the β-phenylethyl radical.

Examples of substituted hydrocarbon radicals as radical R are halogenated hydrocarbon radicals, such as the chloromethyl, 3-chloropropyl, 3,3,3-trifluoropropyl and 5,5,5,4,4,3,3-heptafluoropentyl radical, and the chlorophenyl, dichlorophenyl and trifluorotolyl radical, and also cyanoalkyl radicals, such as the 2-cyanoethyl and 3-cyanopropyl radical.

The radical R is particularly preferably the methyl, n-decyl, n-dodecyl, n-tetradecyl, n-hexadecyl and n-octadecyl radical, especially the methyl radical and the n-dodecyl radical.

Radical $R^1$ preferably comprises alkenyl radicals having 2 to 20 carbon atoms, particularly preferably those with a terminal carbon-carbon double bond, especially the vinyl radical.

Examples of radical $R^1$ are alkenyl radicals, such as the vinyl, allyl, allyloxy, $CH_2=CH-(CH_2)_2-$, $CH_2=CH-(CH_2)_3-$, $CH_2=CH-(CH_2)_4-$, $CH_2=CH-(CH_2)_5-$, $CH_2=CH-(CH_2)_6-$, 4-vinylcyclohexyl and 3-norbornenyl radical.

Radical $R^3$ is particularly preferably hydrogen atom and the methyl radical, especially hydrogen atom.

Radical Y is preferably —$CH_2$—$CH_2$— or —CH($CH_3$)—.

In particular, in the novel organopolysiloxanes, at least 70% of all SiC-bonded radicals are methyl groups.

The novel organopolysiloxanes have a viscosity at 25° C. of preferably from 5 to 500,000 mm$^2$/s, particularly preferably from 10 to 20,000 mm$^2$/s.

The novel organopolysiloxanes preferably have iodine numbers between 0.5 and 20, the iodine number indicating the quantity of iodine in grams consumed in the course of addition onto the double bond per 100 grams of employed material to be analyzed.

The novel organopolysiloxanes have the advantage that they possess a lower viscosity than linear organosiloxanes of comparable molecular weight.

The novel organopolysiloxanes also have the advantage that they are of highly stable viscosity on storage.

The novel organopolysiloxanes can be prepared by any desired methods.

The present invention additionally provides a process for preparing the novel organopolysiloxanes, which comprises reacting linear organosiloxanes A consisting of at least one unit of the formula $$R^4{}_c R^5{}_{2-c} SiO_{2/2} \quad (V),$$

and/or at least one unit of the formula $$R^4{}_d R^5{}_{3-d} SiO_{1/2} \quad (VI),$$

where $R^4$ can be identical or different and is as defined for $R^1$, $R^5$ can be identical or different and is as defined for R, c is 0, 1 or 2, preferably 0, and d is 0, 1, 2 or 3, preferably 0 or 1, with the proviso that organosiloxanes A possess at least one radical $R^4$ and that there is at least one organosiloxane A having 2 units of the formula (VI) where d is not 0, with linear or cyclic organosiloxane B consisting of at least one unit of the formula $$H_f R^7{}_g R^6{}_{3-f-g} SiO_{1/2} \quad (VIII),$$

and/or at least one unit of the formula $$H_e R^6{}_{2-e} SiO_{2/2} \quad (VII),$$

where $R^6$ can be identical or different and is as defined for R, $R^7$ is as defined for $R^1$, e is 0 or 1, f is 0 or 1, and g is 0, 1, 2 or 3, preferably 0, with the proviso that the sum g+f is less than or equal to 3 and that organosiloxane B has at least one unit of the formula (VII) where e is 1, and, if desired, with hydrocarbons C containing aliphatic carbon-carbon multiple bonds and, if desired, in the presence of inert organic solvent D, in the presence of a catalyst E which promotes the addition of Si-bonded hydrogen onto aliphatic multiple bond, with the proviso that in the unreacted mixture of starting materials the molar ratio of the units of the formula (VI) where d is not 0 to the Si-bonded hydrogen atoms present in the units of the formula (VII) is at least 1.3:1, preferably at least 1.5:1.

The components employed in the novel process may each comprise one kind of this component or else various kinds of such components.

The organosiloxanes A employed in the novel process are preferably those comprising units of the formula (V) where c=0 and units of the formula (VI), with the proviso that the organosiloxanes A possess at least one unit of the formula (VI) where d is not 0 and that there is at least one organosiloxane A having 2 units of the formula (VI) where d is not 0.

With particular preference, the organosiloxanes A employed in the novel process are 1,3-divinyl-1,1,3,3-tetramethyldisiloxane, vinylpentamethyldisiloxane, copolymers of vinyldimethylsiloxane and dimethylsiloxane units, and copolymers of vinyldimethylsiloxane, trimethylsiloxane and dimethylsiloxane units, with the proviso that there is at least one organosiloxane A having 2 units of the formula (VI) where d is not 0 in the reaction mixture.

The abovementioned copolymers have a viscosity of preferably from 1 to 20,000 mm$^2$/s, particularly preferably from 2 to 5,000 mm$^2$/s at 25° C., and an iodine number of preferably from 0.5 to 100, particularly preferably from 2 to 80.

In particular, the organosiloxanes A employed in the novel process are copolymers of vinyldimethylsiloxane and dimethylsiloxane units.

Preferably, the linear organosiloxanes B employed in the novel process are copolymers of dimethylhydridosiloxane, dimethylsiloxane and methylhydridosiloxane units, copolymers of trimethylsiloxane, dimethylsiloxane and methylhydridosiloxane units, copolymers of trimethylsiloxane, dimethylhydridosiloxane, dimethylsiloxane and methylhydridosiloxane units, copolymers of vinyldimethylsiloxane, dimethylsiloxane and methylhydridosiloxane units having a viscosity of preferably from 2 to 20,000 mm$^2$/s, particularly preferably from 3 to 5,000 mm$^2$/s, at 25° C.

Preferably, the cyclic organosiloxanes B employed in the novel process are 1,3,5,7-tetramethyltetrahydridocyclotetrasiloxane and 1,3,5,7,9-pentamethylpentahydridocyclopentasiloxane.

With particular preference, the organosiloxanes B employed in the novel process are copolymers of dimethylhydridosiloxane, dimethylsiloxane and methylhydridosiloxane units and copolymers of trimethylsiloxane, dimethylsiloxane and methylhydridosiloxane units.

Preferably, the organosiloxanes B employed in accordance with the invention contain on average at least two units of the formula (VII) where e=1.

The siloxanes A and B employed in accordance with the invention are commercially available products and/or can be prepared by methods which are customary in silicon chemistry.

The hydrocarbons C which have aliphatic carbon-carbon multiple bonds and are employed if desired in the novel process are preferably 1-alkenes having 10 to 18 carbon atoms, such as 1-decene, 1-dodecene, 1-tetradecene, 1-hexadecene and 1-octadecene, with particular preference being given to 1-dodecene and 1-tetradecene.

If component C is employed in the novel process, then the quantities involved are such that the molar ratio of the carbon-carbon multiple bonds of component C to Si-bonded hydrogen in the units of the formula (VII) is not more than 0.5.

The inert organic solvents D employed if desired in the novel process are preferably toluene, xylenes, tetrahydrofuran and cyclohexane.

If inert organic solvent is used in the novel process, then the quantities involved are preferably from 5 to 200 percent by weight, particularly preferably from 10 to 150 percent by weight, based in each case on the overall weight of organosiloxane A and organosiloxane B.

As catalysts E which promote the addition of Si-bonded hydrogen onto aliphatic multiple bond, it is possible in the novel process to employ the same catalysts which it has also been possible to employ to date to promote the addition of Si-bonded hydrogen onto aliphatic multiple bond. The catalysts preferably comprise a metal from the group of the platinum metals or a compound or a complex from the group of the platinum metals.

Examples of such catalysts are metallic and finely divided platinum, which may be on supports such as silica, alumina or activated charcoal, compounds or complexes of platinum, such as platinum halides, for example $PtCl_1$, $H_2PtCl_6 \cdot 6H_2O$, $Na_2PtCl_4 \cdot 4H_2O$, platinum-olefin complexes, platinum-alcohol complexes, platinum-alcoholate complexes, platinum-ether complexes, platinum-aldehyde complexes, platinum-ketone complexes, including reaction products of $H_2PtCl_6 \cdot 6H_2O$ and cyclohexanone, platinum-vinylsiloxane complexes, such as platinum-1,3-divinyl-1,1,3,3-tetramethyldisiloxane complexes with or without a content of detectable inorganically bonded halogen, bis-(γ-picoline) platinum dichloride, trimethylenedipyridineplatinum dichloride, dicyclopentadieneplatinum dichloride, dimethyl sulfoxide-ethyleneplatinum(II) dichloride, cyclooctadiene-platinum dichloride, norbornadiene-platinum dichloride, γ-picoline-platinum dichloride, cyclopentadiene-platinum dichloride and reaction products of platinum tetrachloride with olefin and primary amine or secondary amine or primary and secondary amine in accordance with U.S. Pat. No. 4,292,434, such as the reaction product of platinum tetrachloride, dissolved in 1-octene, with sec-butylamine, or ammonium-platinum complexes according to EP-B 110 370.

In the novel process catalyst E is preferably employed in quantities of from 0.5 to 500 ppm by weight (parts by weight per million parts by weight), particularly preferably in quantities of from 1 to 40 ppm by weight, calculated in each case as elemental platinum and based on the overall weight of organosiloxane A and organosiloxane B.

The novel process is preferably carried out at the pressure of the surrounding atmosphere, i.e. at about 1,000 hPa. However, it can also be carried out at higher and lower pressures. In addition, the novel process is preferably carried out at a temperature of from 50 to 150° C., particularly preferably from 70 to 120° C.

In the novel process the starting materials can be introduced in any order and then brought to reaction by heating.

For example, the novel process can be carried out by initially charging the organosiloxane A, catalyst E and if used, inert organic solvent D to the reaction vessel, then heating the mixture and subsequently metering in, slowly, the organosiloxane B.

If terminally unsaturated hydrocarbon C is used in the novel process, it is preferably first reacted with organosiloxane B in the presence of catalyst E and, if used, solvent D, and only then is organosiloxane A added to the reaction mixture for the subsequent reaction.

Preferably, when the novel reaction is over, any volatile constituents still present, such as organosilicon compounds, hydrocarbon C and organic solvents, are removed, preferably by distillation at a pressure which is preferably from 5 hPa to the pressure of the surrounding atmosphere and at a temperature of from 80 to 180° C.

The reaction product obtained by the novel process may include, in addition to the novel organopolysiloxanes, organosiloxanes A in quantities of preferably from 0 to 30 percent by weight, particularly preferably from 0 to 20 percent by weight, based in each case on the overall weight of reaction product.

The novel process has the advantage that it is possible, simply and with high reproducibility, to prepare branched organopolysiloxanes with a variable degree of branching which are soluble in organic solvents.

The novel process has the advantage that organopolysiloxanes of defined structure, i.e. with a defined number and type of end groups and a defined mean number of siloxane units between the branching sites and defined mean number of siloxane units in the side chains, can be prepared in a simple manner.

The novel process also has the advantage that it is possible to prepare novel organopolysiloxanes in which the branching sites are evenly distributed.

The novel organopolysiloxanes or those prepared in accordance with the invention can be employed for all purposes for which organopolysiloxanes with aliphatically unsaturated radicals have also been used to date.

They are particularly suitable for the preparation of crosslinkable organopolysiloxane compositions, preferably for the production of coatings which repel tacky substances.

The present invention additionally provides crosslinkable organopolysiloxane compositions which comprise (1) novel organopolysiloxanes or organopolysiloxanes prepared in accordance with the invention, (2) organosiloxanes containing Si-bonded hydrogen, (3) catalysts which promote the addition of Si-bonded hydrogen onto aliphatic multiple bond and, if desired, further substances.

The components (2) and (3) and any further substances employed can be the same as those which it has been possible to employ to date in compositions which can be crosslinked by the addition of Si-bonded hydrogen onto aliphatic carbon-carbon multiple bond.

As organosiloxanes (2) containing Si-bonded hydrogen atoms it is preferred to employ linear, cyclic or branched organopolysiloxanes comprising units of the formula

where $R^8$ can be identical or different and is as defined above for R, h is 0, 1, 2 or 3, and i is 0, 1 or 2, with the proviso that the sum of h+i is less than or equal to 3 and that there are on average at least two Si-bonded hydrogen atoms per molecule.

Although not expressed by formula (IX), up to 8% of the radicals $R^8$ in the organopolysiloxane (2) can also have the meaning of alkoxy radical.

The organosiloxanes (2) preferably have an average viscosity of from 5 to 1,000 $mm^2/s$, particularly preferably from 10 to 500 $mm^2/s$, at 25° C.

Preferably, at least 50% of all SiC-bonded radicals or organosiloxane (2) are methyl radicals.

The organosiloxane (2) employed in accordance with the invention preferably contains on average at least 3 Si-bonded hydrogen atoms per molecule.

The organosiloxane (2) employed in accordance with the invention preferably contains Si-bonded hydrogen in quantities of from 0.1 to 2 percent by weight, particularly preferably from 0.5 to 1.7 percent by weight, based in each case on the weight of the organopolysiloxane (2).

Organopolysiloxane (2) preferably comprises copolymers of dimethylhydridosiloxane, methylhydridosiloxane, dimethylsiloxane and trimethylsiloxane units, copolymers of trimethylsiloxane, dimethylhydridosiloxane and methylhydridosiloxane units, copolymers of trimethylsiloxane, dimethylsiloxane and methylhydridosiloxane units, copolymers of methylhydridosiloxane and trimethylsiloxane units, copolymers of methylhydridosiloxane, diphenylsiloxane and trimethylsiloxane units, copolymers of methylhydridosiloxane, dimethylhydridosiloxane and diphenylsiloxane units, copolymers of methylhydridosiloxane, phenylmethylsiloxane, trimethylsiloxane and dimethylhydridosiloxane units, copolymers of methylhydridosiloxane, dimethylsiloxane, diphenylsiloxane, trimethylsiloxane and/or dimethylhydridosiloxane units and also copolymers of dimethylhydridosiloxane, trimethylsiloxane, phenylhydridosiloxane, dimethylsiloxane and/or phenylmethylsiloxane units.

Organopolysiloxane (2) particularly preferably comprises copolymers of trimethylsiloxane and methylhydridosiloxane units and copolymers of trimethylsiloxane, dimethylsiloxane and methylhydridosiloxane units.

Organopolysiloxanes (2) are generally known products and/or can be prepared by methods common in silicon chemistry.

In the novel composition siloxane (2) is employed in quantities of preferably from 0.7 to 5 mol of Si-bonded hydrogen, particularly preferably from 1.1 to 3 mol of Si-bonded hydrogen, based in each case on 1 mol of aliphatic carbon-carbon multiple bond of the novel organopolysiloxane (1) or the organopolysiloxane (1) prepared in accordance with the invention.

As catalyst (3) which promotes the addition of Si-bonded hydrogen onto aliphatic multiple bond it is also possible to employ, in the novel organopolysiloxane compositions, the same catalysts which it has also been possible to employ to date to promote the addition of Si-bonded hydrogen onto aliphatic multiple bond, the examples and preferred species of such substances being those indicated above for catalyst E.

In the novel organopolysiloxane compositions catalyst (3) is preferably employed in quantities of from 5 to 500 ppm by weight (parts by weight per million parts by weight), particularly preferably in quantities of from 10 to 200 ppm by weight, in each case calculated as elemental platinum and based on the overall weight of novel composition.

In addition to component (1), (2) and (3) the novel organopolysiloxane compositions can contain compounds (4), so-called inhibitors, which retard the addition of Si-bonded hydrogen onto aliphatic multiple bond.

Examples of inhibitors (4) which are employed if desired are alkynols, fumaric acid, maleic acid, fumarates and maleates.

In the novel compositions inhibitor (4) is preferably employed in quantities from 0.001 to 5 percent by weight, particularly preferably in quantities of from 0.01 to 1.0 percent by weight, based in each case on the overall weight of novel composition.

In addition to component (1), (2), (3) and, if used, (4), the novel organopolysiloxane compositions can contain organopolysilicone resins (5).

The organopolysilicone resins which are used if desired in the novel compositions as component (5) are preferably so-called MQ resins comprising units of the formula

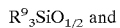 and

 (X), in which $R^9$ can be identical or different and is hydrogen or monovalent, SiC-bonded, substituted or unsubstituted hydrocarbon radical.

Examples of radical $R^9$ are hydrogen atom and the examples indicated for radical R and $R^1$, with preference being given to the methyl radical and the vinyl radical.

The organopolysiloxane resins (5) employed if desired in the novel compositions are preferably those according to WO 93/23455 (Wacker-Chemie GmbH; published on Nov. 25, 1993) and the German application P 44 36 817.8 (Wacker-Chemie GmbH; filed on Oct. 14, 1994) or the corresponding US application with the serial number U.S. Ser. No. 08/520331, and the German application with the file reference 19502034.0 (Wacker-Chemie GmbH; filed on Jan. 24, 1995).

By way of the quantity of organopolysilicone resin (5) it is possible in particular to regulate the release properties of the novel compositions. Thus, for example, the release values rise as the quantity of organopolysiloxane resin (5) increases.

If organopolysiloxane resin (5) is used in the novel compositions, then it is preferably employed in quantities of from 0.5 to 95 percent by weight, particularly preferably in quantities of from 1 to 80 percent by weight, based in each case on the weight of the novel organopolysiloxane (1) or the organopolysiloxane (1) prepared in accordance with the invention.

The novel organopolysiloxane compositions can additionally comprise linear organopolysiloxane containing aliphatic carbon-carbon multiple bond (6).

The linear organosiloxanes with aliphatic carbon-carbon multiple bond (6) which are employed if desired are preferably the organosiloxanes A described above.

The organosiloxanes (6) are particularly preferably α,ω-divinylpolydimethylsiloxanes having a viscosity of from 20 to 1,000 mm$^2$/s at 25° C.

If organosiloxanes (6) are used in the novel compositions, then they are employed in quantities of from 1 to 40 percent by weight, particularly preferably in quantities of from 3 to 25 percent by weight, based in each case on the novel organopolysiloxane (1) or organopolysiloxane (1) prepared in accordance with the invention.

The novel organopolysiloxane compositions can additionally comprise hydrocarbons (7) containing aliphatic carbon-carbon multiple bonds.

The hydrocarbons (7) containing aliphatic carbon-carbon multiple bonds, which are employed if desired, are preferably 1-alkenes having 10 to 14 carbon atoms, such as 1-decene, 1-dodecene and 1-tetradecene.

If hydrocarbons (7) containing aliphatic carbon-carbon multiple bonds are used, then they are preferably employed in quantities of from 0.2 to 40 percent by weight, particularly preferably in quantities of from 0.5 to 25 percent by weight, based in each case on the overall weight of novel composition.

In the case of the novel organopolysiloxane compositions it is possible if desired to use organic solvents. If organic solvents are used, then they may be the same as those which it has also been possible to employ to date in compositions which can be crosslinked by addition of Si-bonded hydrogen onto aliphatic carbon-carbon multiple bond.

Examples of such solvents are petroleum spirits, for example alkane mixtures with a boiling range from 80 to 100° C. at the pressure of the surrounding atmosphere, n-heptane, benzene, toluene and xylenes, halogenated alkanes having 1 to 6 carbon atoms, such as methylene chloride, trichloroethylene and perchloroethylene, ethers, such as di-n-butyl ether, esters, such as ethyl acetate, and ketones, such as methyl ethyl ketone and cyclohexanone.

If organic solvents are used in the novel compositions, then they are preferably employed in quantities of from 5 to 95 percent by weight, particularly preferably in quantities of from 10 to 70 percent by weight, based in each case on the overall weight of novel composition.

The novel crosslinkable organopolysiloxane compositions may additionally comprise customary and previously known additives, such as preservatives, colorants, fungicides, plasticizers, etc.

The novel compositions preferably consist of constituents (1), (2), (3) and, if used, one or more of constituents (4), (5), (6), (7), organic solvent and additives, with particular preference being given to novel compositions consisting of components (1), (2), (3) and, if used, one or more of constituents (4), (5) and (6).

The novel organopolysiloxane compositions can also be processed as emulsion or dispersion. If the novel compositions are to be dispersions, it is of course possible to employ the additives which are customary for the production of dispersions, for example emulsifiers and water, and also the customary dispersing equipment.

The novel crosslinkable organopolysiloxane compositions can be prepared by any desired, known methods, such as simple mixing of the individual constituents. When mixing the constituents (1) to (3) and, if used, (4) to (7) and any further substances added, the sequence is not in fact critical, although it has been found in practice to be expedient to add the catalyst (3) last of all to the mixture of the other constituents.

The novel compositions can also be in the form of a so-called 2-component silicone rubber composition. In this case, therefore, the two components of the novel silicone rubber compositions may include all constituents in any desired combinations and proportions, with the proviso that one component does not simultaneously contain the constituents (1), (2) and (3).

The novel crosslinkable compositions can be employed for all purposes for which organopolysiloxane compositions which crosslink by addition of Si-bonded hydrogen onto aliphatic multiple bond have also been employed to date.

The novel compositions are preferably employed for the production of coatings, especially coatings which repel tacky substances, such as, for example, for the production of release coatings against adhering articles. Thus they are suitable, for example, for the production of release, backing and interleaving papers, including interleaving and release papers which are employed in the production of, for example, cast films or decorative films, or of foams, including those made from polyurethane. The novel compositions are also suitable, for example, for the production of release, backing and interleaving cards, films and cloths, for treating the reverse sides of self-adhesive tapes or self-adhesive films or the written sides of self-adhesive labels. The novel compositions are also suitable for treating packaging material, such as that comprising paper, cardboard boxes, metal foils and drums, for example cardboard, plastic, wood or iron, which is or are intended for the storage and/or transportation of tacky goods, such as adhesives, sticky foodstuffs, for example cakes, honey, candies and meat, bitumen, asphalt, greased materials and crude rubber. A further example of the use of the novel compositions is the treatment of supports for the transfer of pressure-sensitive adhesive layers in the so-called transfer process.

The novel compositions are suitable for the production of the self-adhesive materials connected to the release paper, both by the off-line method and by the in-line method.

The novel crosslinkable compositions can be applied to the surfaces, for instance the surfaces which are to be made repellent to tacky substances, in any desired manner which is suitable and widely known for the production of coatings from liquid substances, for example by dipping, brushing, flow coating, spraying, rolling or printing, for example by means of an off-set gravure coating apparatus, by knife coating or doctor-blade coating, or using an airbrush, which is preferably used when the novel composition is applied in the form of an emulsion or dispersion.

The surfaces which are to be made repellent to tacky substances and can be treated within the scope of the invention may be surfaces of any substances which are solid at room temperature and at from 900 to 1100 hPa. Examples of such surfaces are those of paper, wood, cork and polymer films, for example polyethylene films or polypropylene films, woven and nonwoven cloth of natural or synthetic fibers or glass fibers, ceramic articles, glass, metals, polyethylene-coated paper, and boards, including those of asbestos. The polyethylene mentioned above may in each case be high-pressure, medium-pressure or low-pressure polyethylene. The paper may comprise low-grade papers, such as absorbent papers, including raw—i.e. not pretreated with chemicals and/or with polymeric natural substances—kraft paper having a weight of from 60 to 150 g/m², unsized papers, papers of low freeness value, mechanical papers, unglazed or uncalendered papers, papers which are smooth on one side owing to the use of a dry glazing cylinder during their production without additional complex measures, and are therefore referred to as "machine-glazed papers", uncoated papers or papers produced from waste paper, i.e. so-called recycled papers. The paper to be treated in accordance with the invention may, however, also of course comprise high-grade papers, such as low-absorbency papers, sized papers, papers of high freeness value, chemical papers, calendered or glazed papers, glassine papers, parchmentized papers or precoated papers. Cards and boards may also be of high or low grade.

The novel crosslinkable organopolysiloxane compositions can be crosslinked in a known manner, during which any terminally unsaturated hydrocarbon (7) is incorporated chemically into the silicone matrix.

The novel compositions are preferably crosslinked at from 50 to 200° C., particularly preferably from 60 to 150° C., at a pressure from 900 to 1100 hPa. If the novel compositions are crosslinked at relatively low temperatures, i.e. in the range from preferably 50 to 110° C., then it is preferred in the novel compositions to employ novel organopolysiloxanes (1), or organopolysiloxanes (1) prepared in accordance with the invention, which also include units of the formula (II) where b=0.

Preferred energy sources for crosslinking by heating are ovens, for example convection ovens, heating tunnels, heated rollers, heated plates or heat rays in the infrared region. The novel compositions can be crosslinked not only by heating but also by irradiation with ultraviolet light or with UV and/or IR light. Ultraviolet light used is commonly that with a wavelength of 253.7 nm. A host of lamps which emit ultraviolet light with a wavelength of from 200 to 400 nm and which preferentially emit ultraviolet light with a wavelength of 253.7 nm is available commercially.

The novel compositions have the advantage that they crosslink rapidly even at relatively low temperatures.

The novel compositions also have the advantage that the resulting crosslinked organopolysiloxane films possess a high abrasion strength on a wide variety of substrates even after prolonged storage, especially on smooth substrates such as polymer films or polymer-coated papers.

The novel compositions have the advantage that the resulting crosslinked organopolysiloxane films have a low content of extractable constituents.

The novel compositions have the advantage, furthermore, that the resulting crosslinked organopolysiloxane films lead to reproducible release values relative to a wide variety of adhesives.

The novel compositions have the advantage that the crosslinked organopolysiloxane films obtained lead to markedly graduated, reproducible release values, which are stable over time, relative to a wide variety of adhesives, the graduation of the release values depending essentially on the different quantities of organopolysiloxane resin (5) present in the novel compositions.

The novel compositions have the advantage that the properties of crosslinked organopolysiloxane films depend only slightly, if at all, on the storage period of the ready-to-use formulation prior to crosslinking.

In the examples which follow, all parts and percentages are by weight unless specified otherwise. Unless specified otherwise, the following examples are carried out at the pressure of the surrounding atmosphere, i.e. at about 1,000 hPa, and at room temperature, i.e. at about 20° C., or at the temperature which is established when the reactants are combined at room temperature without additional heating or cooling. All viscosity data indicated in the examples are intended to relate to a temperature of 25° C.

The iodine number is a meaure of the content of aliphatic carbon-carbon multiple bonds in a substance and is the number which indicates how many g of iodine are bonded by 100 g of substance analyzed.

The substrates indicated in the following examples are coated with the novel organopolysiloxane compositions using a metallic drawing rod, a so-called manual doctor blade, with slow, even guidance, to give a weight per unit area of about 1.5 g/m², or rapidly with uniform pressure using a glass rod, so that the weight per unit area is about 4 g/m².

The coated substrates are crosslinked while suspended in a convection oven at the temperatures and for the times indicated in the following examples.

The coated substrates are irradiated in a UV apparatus from Beltron Xenon Impulslicht GmbH (D-Roedermark) with a 100 watt UV lamp from Philips. The distance of the coated substrate from the UV lamp is 8.5 cm.

The release values are determined in accordance with FINAT Test No. 10. In this test, the coated substrate has applied to it, directly after crosslinking, the respective adhesive, which is pressed on by rolling over two times with the FINAT roller. The laminate is then stored for 20 hours at a temperature of 70° C. and a pressure of 70 g/cm². After storage, the release values are determined on a computer pull-off instrument from Roell and Korthaus (CH-Merlshausen) under a pull-off angle of 180° C. and at a pull-off speed of 300 mm per minute.

The release values are measured relative to rubber adhesives of designation T-4154 and K-7476 and an acrylic adhesive of designation A-7475 (each obtainable commercially from Beiersdorf, D-Hamburg).

In order to assess the completeness of cross-linking of the cured organosiloxane coatings, the so-called stripe test is employed. In this context, directly after the crosslinking of the organosiloxane coating on the substrate surface, the dry finger tip is used to draw a stripe about 25 cm long, rapidly and under uniform pressure, over the silicone layer. If the crosslinking of the organopolysiloxane film is incomplete, part of the silicone surface is wiped away. This becomes evident as a smear track whose extent is evaluated with ratings from 1 to 6, the rating 1 denoting no visible stripe (very good crosslinking), the rating 3 denoting a slight stripe and the rating 6 denoting a severe stripe (very poor crosslinking), and the ratings in between being used to indicate further fine graduations in the completeness of crosslinking.

The determination of the so-called residual adhesive force, which is likewise a measure of the completeness of crosslinking of the organopolysiloxane film, is carried out in accordance with FINAT Test No. 11. In this test, 65 g/m² glassine paper is coated with the novel organosiloxane composition, which is then vulcanized, and the siliconized paper then has applied to it the abovementioned rubber adhesive of designation T-4154 and is then pulled off again in accordance with FINAT Test No. 10. Using this adhesive, the release value according to FINAT Test No. 10 (release value A) is then determined on am acetate film. For comparison, the release value of a fresh rubber adhesive on the acetate film is employed (release value B). The residual adhesive force is determined in accordance with the following formula:

$$\text{residual adhesive force in \%} = \frac{\text{release value } A}{\text{release value } B} \times 100$$

The higher the residual adhesive force value, the more complete the crosslinking of the organopolysiloxane film.

In order to determine silicone constituents in the crosslinked organopolysiloxane coating which are still extractable, a siliconized paper strip with an area of 5×20 cm is cut out, using a sharp knife and a template, directly after curing from a 65 g/m² glassine paper coated with the novel organopolysiloxane composition. The siliconized paper strip is then rolled up loosely, placed in a small 25 cm³ sample flask and treated with 20 ml of methyl isobutyl ketone so that the siliconized paper strip is entirely immersed in the extractant. The extraction time is 10 hours. The silicon content of the extraction solution is then determined by means of atomic absorption, permitting calculation of a theoretical silicone add-on A (in g/m²) in accordance with the following formula:

$$\text{silicon content (g/ml)} \times 0.00528 = \text{silicone add-on A (g/m}^2\text{)}$$

At the same time, X-ray fluorescence is used to determine the silicone add-on B (in g/m²) of the unextracted siliconized paper. The extractable constituents can then be determined in accordance with the following formula:

$$\text{extractable constituents in \%} = \frac{\text{silicone add-on } A}{\text{silicone add-on } B} \times 100$$

In order to assess the abrasion strength of the crosslinked organosiloxane coatings, the siliconized substrate is stretched between thumb and index finger. Then, with some force, the finger of the other hand is used to rub the siliconized substrate several times backward and forward rapidly. If adhesion of the silicone film to the substrate is incomplete, part of the silicone coating becomes detached. The abrasion is assessed in accordance with its extent using ratings from 1 to 6, rating 1 denoting no abrasion, rating 3 denoting slight abrasion and rating 6 denoting severe abrasion, with the ratings in between being used to indicate further fine graduations in the degree of abrasion.

EXAMPLE 1

58.2 g of a copolymer of trimethylsiloxane, dimethylsiloxane and methylhydridosiloxane units having a viscosity of 77 mm²/s and a content of Si-bonded hydrogen of 0.048%, 200 g of a copolymer of vinyldimethylsiloxane and dimethylsiloxane units having a viscosity of 157 mm²/s and an iodine number of 7, 258.2 g of toluene and platinum in the form of a platinum-1,3-divinyl-1,1,3,3-tetramethyldisiloxane complex and in a quantity such that the overall mixture has a platinum content of 6 ppm based on elemental platinum are mixed in the stated sequence. The mixture is then heated with stirring to 90° C. and held at 90° C. for one hour. Then toluene and any other volatile constituents are removed from the reaction mixture by distillation at a temperature of 150° C. and a pressure of 10 hPa. 255.7 g of an organopolysiloxane are obtained which is completely soluble in organic solvents such as toluene and xylene and has a viscosity of 1656 mm²/s and an iodine number of 3.2. Even after storage at 25° C. for 10 weeks, there is no change in the viscosity of the organopolysiloxane.

EXAMPLE 2

458.5 g of a copolymer of trimethylsiloxane, dimethylsiloxane and methylhydridosiloxane units having a viscosity of 115 mm$^2$/s and a content of Si-bonded hydrogen of 0.047%, 270.8 g of a copolymer of vinyldimethylsiloxane and dimethylsiloxane units having a viscosity of 42 mm$^2$/s and an iodine number of 20.9, 270.8 g of a copolymer of vinyldimethylsiloxane and dimethylsiloxane units having a viscosity of 30 mm$^2$/s and an iodine number of 25.7, 428.5 g of toluene and platinum in the form of a platinum-1,3-divinyl-1,1,3,3-tetramethyldisiloxane complex and in a quantity such that the overall mixture has a platinum content of 3 ppm based on elemental platinum are mixed in the stated sequence. The mixture is then heated with stirring to 90° C. and held at 90° C. for one hour. Then toluene and any other volatile constituents are removed from the reaction mixture by distillation at a temperature of 150° C. and a pressure of 10 hPa. 975.6 g of an organopolysiloxane are obtained which is completely soluble in organic solvents such as toluene and xylene and has a viscosity of 3055 mm$^2$/s and an iodine number of 7.3. Even after storage at 25° C. for 10 weeks, there is no change in the viscosity of the organopolysiloxane.

EXAMPLE 3

158 g of the copolymer of trimethylsiloxane, dimethylsiloxane and methylhydridosiloxane units used in Example 1, 200 g of a copolymer of vinyldimethylsiloxane and dimethylsiloxane units having a viscosity of 30 mm$^2$/s and an iodine number of 22.1 and platinum in the form of a platinum-1,3-divinyl-1,1,3,3-tetramethyldisiloxane complex and in a quantity such that the overall mixture has a platinum content of 7 ppm based on elemental platinum are mixed in the stated sequence. The mixture is then heated with stirring to 90° C. and held at 90° C. for one hour. Then any volatile constituents are removed from the reaction mixture by distillation at a temperature of 150° C. and a pressure of 10 hPa. 341.3 g of an organopolysiloxane are obtained which is completely soluble in organic solvents such as toluene and xylene and has a viscosity of 680 mm$^2$/s and an iodine number of 6.75. Even after storage at 25° C. for 10 weeks, there is no change in the viscosity of the organopolysiloxane.

EXAMPLE 4

183.3 g of a copolymer of trimethylsiloxane, dimethylsiloxane and methylhydridosiloxane units having a viscosity of 30 mm$^2$/s and a content of Si-bonded hydrogen of 0.044%, 100 g each of the copolymers of vinyldimethylsiloxane and dimethylsiloxane units used in Example 2, and platinum in the form of a platinum-1,3-divinyl-1,1,3,3-tetramethyldisiloxane complex and in a quantity such that the overall mixture has a platinum content of 7 ppm based on elemental platinum are mixed in the stated sequence. The mixture is then heated with stirring to 90° C. and held at 90° C. for one hour. Then any volatile constituents are removed from the reaction mixture by distillation at a temperature of 150° C. and a pressure of 10 hPa. 367.9 g of an organopolysiloxane are obtained which is completely soluble in organic solvents such as toluene and xylene and has a viscosity of 105 mm$^2$/s and an iodine number of 7.1. Even after storage at 25° C. for 10 weeks, there is no change in the viscosity of the organopolysiloxane.

EXAMPLE 5

The procedure described in Example 4 is repeated with the modification that, instead of 183.3 g of the copolymer of trimethylsiloxane, dimethylsiloxane and methylhydridosiloxane units 281.1 g are employed. 468.4 g of an organopolysiloxane are obtained which is completely soluble in organic solvents such as toluene and xylene and has a viscosity of 266 mm$^2$/s and an iodine number of 2.84. Even after storage at 25° C. for 10 weeks, there is no change in the viscosity of the organopolysiloxane

EXAMPLE 6

150 g of a copolymer of trimethylsiloxane, dimethylsiloxane and methylhydridosiloxane units having a viscosity of 64 mm$^2$/s and a content of Si-bonded hydrogen of 0.046%, 1.74 g of 1-dodecene and platinum in the form of a platinum-1,3-divinyl-1,1,3,3-tetramethyldisiloxane complex and in a quantity such that the overall mixture has a platinum content of 12 ppm based on elemental platinum are mixed in the stated sequence. The mixture is then heated with stirring to 90° C. and held at 90° C. for one hour. The reaction mixture is then cooled to 50° C., and 63 g of each of the copolymers of vinyldimethylsiloxane and dimethylsiloxane units used in Example 2 are added. The mixture is then heated to 90° C. and held at 90° C. for one hour. Then any volatile constituents are removed from the reaction mixture by distillation at a temperature of 150° C. and a pressure of 10 hPa. 265.6 g of an organopolysiloxane are obtained which is completely soluble in organic solvents such as toluene and xylene and has a viscosity of 473 mm$^2$/s and an iodine number of 5.3. Even after storage at 25° C. for 10 weeks, there is no change in the viscosity of the organopolysiloxane. $^1$H-NMR measurements show that the terminally unsaturated hydrocarbon has been incorporated chemically into the organosiloxane.

EXAMPLE 7

158 g of a copolymer of dimethylhydridosiloxane, dimethylsiloxane and methylhydridosiloxane units having a viscosity of 94 mm$^2$/s and a content of Si-bonded hydrogen of 0.048%, 200 g of the copolymer of vinyldimethylsiloxane and dimethylsiloxane units used in Example 3, and platinum in the form of a platinum-1,3-divinyl-1,1,3,3-tetramethyldisiloxane complex and in a quantity such that the overall mixture has a platinum content of 7 ppm based on elemental platinum are mixed in the stated sequence. The mixture is then heated with stirring to 90° C. and held at 90° C. for one hour. Then any volatile constituents are removed from the reaction mixture by distillation at a temperature of 150° C. and a pressure of 10 hPa. 343.4 g of an organopolysiloxane are obtained which is completely soluble in organic solvents such as toluene and xylene and has a viscosity of 460 mm$^2$/s and an iodine number of 6.9. Even after storage at 25° C. for 10 weeks, there is no change in the viscosity of the organopolysiloxane.

EXAMPLE 8

283 g of the copolymer of dimethylhydridosiloxane, dimethylsiloxane and methylhydridosiloxane units used in Example 7, 25 g of 1,3-divinyl-1,1,3,3-tetramethyldisiloxane and platinum in the form of a platinum-1,3-divinyl-1,1,3,3-tetramethyldisiloxane complex and in a quantity such that the overall mixture has a platinum content of 9 ppm based on elemental platinum are mixed in the stated sequence. The mixture is then heated with stirring to 90° C. and held at 90° C. for one hour. Then any volatile constituents are removed from the reaction mixture by distillation at a temperature of 150° C. and a pressure of 10 hPa. 293.5 g of an organopolysiloxane are obtained which is completely soluble in organic solvents such as toluene and xylene and has a viscosity of 623 mm$^2$/s and an iodine number of 5.6. Even after storage at 25° C. for 10 weeks, there is no change in the viscosity of the organopolysiloxane.

EXAMPLE 9

58.2 g of the copolymer used in Example 7 of dimethylhydridosiloxane, dimethylsiloxane and methylhydridosiloxane units, 200 g of the copolymer used in Example 1 of vinyldimethylsiloxane and dimethylsiloxane units, 258 g of toluene and platinum in the form of a platinum-1,3-divinyl-1,1,3,3-tetramethyldisiloxane complex and in a quantity such that the overall mixture has a platinum content of 7 ppm based on elemental platinum are mixed in the stated sequence. The mixture is then heated with stirring to 90° C. and held at 90° C. for one hour. Then toluene and any other volatile constituents are removed from the reaction mixture by distillation at a temperature of 150° C. and a pressure of 10 hPa. 255.7 g of an organopolysiloxane are obtained which is completely soluble in organic solvents such as toluene and xylene and has a viscosity of 1716 mm$^2$/s and an iodine number of 3.2. Even after storage at 25° C. for 10 weeks, there is no change in the viscosity of the organopolysiloxane.

EXAMPLE 10

132 g of a copolymer of dimethylhydridosiloxane, dimethylsiloxane and methylhydridosiloxane units having a viscosity of 66 mm$^2$/s and a content of Si-bonded hydrogen of 0.061%, 100 g each of the copolymers of vinyldimethylsiloxane and dimethylsiloxane units used in Example 2, and platinum in the form of a platinum-1,3-divinyl-1,1,3,3-tetramethyldisiloxane complex and in a quantity such that the overall mixture has a platinum content of 7 ppm based on elemental platinum are mixed in the stated sequence. The mixture is then heated with stirring to 90° C. and held at 90° C. for one hour. Then any volatile constituents are removed from the reaction mixture by distillation at a temperature of 150° C. and a pressure of 10 hPa. 317.4 g of an organopolysiloxane are obtained which is completely soluble in organic solvents such as toluene and xylene and has a viscosity of 462 mm$^2$/s and an iodine number of 7.7. Even after storage at 25° C. for 10 weeks, there is no change in the viscosity of the organopolysiloxane.

EXAMPLE 11

The procedure described in Example 10 is repeated with the modification that, instead of 132 g of the copolymer of dimethylhydridosiloxane, dimethylsiloxane and methylhydridosiloxane units 152 g are employed. 336.5 g of an organopolysiloxane are obtained which is completely soluble in organic solvents such as toluene and xylene and has a viscosity of 928 mm$^2$/s and an iodine number of 6.2. Even after storage at 25° C. for 10 weeks, there is no change in the viscosity of the organopolysiloxane.

EXAMPLE 12

The constituents set out below are mixed to prepare a coating composition I: 100 parts of organopolysiloxane according to Example 3, 0.09 part of ethynylcyclohexanol, a copolymer of trimethylsiloxane, dimethylsiloxane and methylhydridosiloxane units having a viscosity of 25 mm$^2$/s and a content of Si-bonded hydrogen of 1.62% in a quantity such that the molar ratio of the Si-bonded hydrogen atoms to the vinyl groups of the novel organopolysiloxane employed has the value 2, and platinum in the form of a platinum-1,3-divinyl-1,1,3,3-tetramethyldisiloxane complex in a quantity such that the overall mixture has a platinum content of 100 ppm based on elemental platinum.

A coating composition II is prepared in analogy to the coating composition I but with the modification that, instead of 100 parts of organopolysiloxane according to Example 3, 100 parts of organopolysiloxane according to Example 7 are employed.

The coating compositions I and II thus prepared are drawn out directly after their preparation, using a glass rod, onto 65 g/m$^2$ glassine papers to give a weight per unit area of about 4 g/m$^2$.

Subsequently, directly after coating, the coated papers are cured at 85° C. and, respectively, at 150° C. for the different times indicated in Table 1 and are assessed by means of the finger stripe test and the test for abrasion resistance.

In order to determine the release values and the residual adhesive force, the coated papers are cured at 150° C. for 5 seconds.

The results are given in Table 1.

COMPARISON EXAMPLE 1

The procedure described in Example 12 is repeated with the modification that the coating composition employed includes, instead of 100 parts of the organopolysiloxane according to Example 3, 100 parts of a linear copolymer of vinyldimethylsiloxane and dimethylsiloxane units having a viscosity of 195 mm$^2$/s and an iodine number of 6.8 (coating composition Comp1).

The results are given in Table 1.

TABLE 1

| | Crosslinking temperature | | | | | | | |
|---|---|---|---|---|---|---|---|---|
| | 85° C. | | | | 150° C. | Residual | Release values | |
| | Crosslinking time [s] | | | | | adhesive | [cN/cm] | |
| Composition | 8 | 10 | 12 | 15 | 4 | force | Adhesive | |
| | Finger stripe test | | | | | [%] | T-4154 | K-7476 | A-7475 |
| I | 2–3 | 2 | 1–2 | 1 | 1 | 119 | 2.9 | 7.1 | 6.9 |
| II | 2 | 1 | 1 | 1 | 1 | 121 | 5.0 | 12.7 | 7.8 |
| Comp 1 | 3 | 2–3 | 2 | 1 | 1 | 111 | 3.1 | 11.7 | 7.3 |

At the curing time at which the coated papers were assessed with the rating 1 in the finger stripe test, the test for abrasion resistance, which is carried out directly after curing, is also assessed with the rating 1.

EXAMPLE 13

The procedure described in Example 12 is repeated with the modification that, instead of the copolymer of trimethylsiloxane, dimethylsiloxane and methylhydridosiloxane units having a viscosity of 25 mm$^2$/s and a content of Si-bonded hydrogen of 1.62%, a copolymer of trimethylsiloxane, dimethylsiloxane and methylhydridosiloxane units having a viscosity of 39 mm$^2$/s and a content of Si-bonded hydrogen of 1.17% is employed, likewise in a quantity such that the molar ratio of the Si-bonded hydrogen atoms to the vinyl groups of the organopolysiloxane prepared according to Example 3 or, respectively, to Example 7 has the value 2. This gives the coating composition III, which is based on the organopolysiloxane according to Example 3, and the coating composition IV, which is based on the organopolysiloxane according to Example 7. The results are given in Table 2.

COMPARISON EXAMPLE 2

The procedure described in Comparison Example 1 is repeated with the modification that, instead of the copolymer of trimethylsiloxane, dimethylsiloxane and methylhydridosiloxane units having a viscosity of 25 mm$^2$/s and a content of Si-bonded hydrogen of 1.62%, a copolymer of trimethylsiloxane, dimethylsiloxane and methylhydridosiloxane units having a viscosity of 39 mm$^2$/s and a content of Si-bonded hydrogen of 1.17% is employed, likewise in a quantity such that the molar ratio of the Si-bonded hydrogen atoms to the vinyl groups of the linear organopolysiloxane employed has the value 2 (coating composition Comp2). The results are given in Table 2.

TABLE 2

| Composition | Crosslinking temperature 85° C. Crosslinking time [s] Finger stripe test | | | | Residual adhesive force [%] | Abrasion resistance after a curing time of 10 seconds at a temperature of 85° C. | |
|---|---|---|---|---|---|---|---|
| | 4 | 6 | 8 | 10 | | directly after curing | after three days |
| III | 4 | 1–2 | 1 | 1 | 119 | 1 | 1 |
| IV | 3 | 1 | 1 | 1 | 121 | 1 | 2 |
| Comp 2 | —* | 3 | 1–2 | 1 | 111 | 1 | 3 |

*No measurement results present

EXAMPLE 14

The coating compositions I and II according to Example 12 are each drawn out, directly after their preparation and, respectively, after a storage period of 2 hours, using a hand doctor blade onto 65 g/m$^2$ glassine paper to give a weight per unit area of in each case about 1.5 g/m$^2$.

Subsequently, directly after coating, the coated papers are cured at 85° C. for different periods and, directly after curing or, respectively, after different storage of the cured coated papers, the extractable silicone constituents are determined.

The results are given in Table 3.

In the case of coating composition II the value for the extractable constituents on coating directly after preparation of the coating composition and directly after curing at a crosslinking temperature of 150° C. and a curing time of 5 seconds is 1.9%.

TABLE 3

| | Storage time of the composition following preparation in hours | | | | | | Storage time of the composition: 0 Hours | | | | |
|---|---|---|---|---|---|---|---|---|---|---|---|
| | 0 | | | 2 | | | Crosslinking time: 12 s | | | | |
| | Crosslinking time [s] | | | | | | Storage time of the cured paper [min] | | | | |
| Composition | 16 | 20 | 30 | 16 | 20 | 30 | 5 | 15 | 60 | 120 | 240 |
| | Extractable constituents [%] | | | | | | | | | | |
| I | 11.6 | 10.4 | 8.7 | 17.5 | 16.0 | 9.7 | 12.1 | 10.9 | 7.9 | 8.2 | 7.4 |
| II | 7.2 | 5.3 | 3.9 | 20.4 | 12.6 | 9.4 | 10.2 | 8.2 | 3.6 | 3.1 | 2.1 |
| Comp 1 | 15.6 | 12.4 | 7.9 | 40.7 | 24.8 | 16.3 | 30.1 | 17.2 | 11.3 | 7.9 | 6.0 |

COMPARISON EXAMPLE 3

The procedure described in Example 14 is repeated with the modification that, instead of the coating composition I or II, the coating composition Comp1 from Comparison Example 1 is employed. The results are given in Table 3.

The value for the extractable constituents on coating immediately after preparation of the coating composition and immediately after curing at a crosslinking temperature of 150° C. and a curing time of 5 seconds is 3.4%.

EXAMPLE 15

The coating compositions I and II according to Example 12 are drawn out, in each case directly after their preparation, using a glass rod onto the substrates listed below, to give a weight per unit area of in each case about 4 g/m$^2$.

Substrate (a): polyethylene-laminated paper

Substrate (b): low-pressure polyethylene film

Substrate (c): high-pressure polyethylene film

Substrate (d): polyester film

Substrate (e): clay-coated paper with a weight of 140 g/m$^2$

Substrate (f): clay-coated paper with a weight of 80 g/m$^2$

Substrate (g): clay-coated paper with a weight of 135 g/m$^2$

Substrate (h): clay-coated paper with a weight of 87 g/m$^2$

Subsequently, directly after coating, the coated substrates are cured at $_{85}$° C. for a period of time which differs depending on the substrate used. Then, depending on the storage period of the cured coated substrates, the abrasion resistance is assessed. The results are given in Table 4.

COMPARISON EXAMPLE 4

The procedure described in Example 15 is repeated with the modification that, instead of the coating composition I or II, the coating composition Comp1 from Comparison Example 1 is employed.

The results are given in Table 4.

TABLE 4

| Composition | Storage time of the cured coated substrates in days | Substrate (a) | (b) | (c) | (d) | (e) | (f) | (g) | (h) |
|---|---|---|---|---|---|---|---|---|---|
| | | \multicolumn{8}{c}{Crosslinking time [s]} | | | | | | | |
| | | 30 | 15 | 15 | 15 | 30 | 20 | 30 | 20 |
| | | \multicolumn{8}{c}{Abrasion resistance} | | | | | | | |
| I | 0 | 1 | 1 | 1 | 1 | 1 | 1 | 1 | 1 |
| | 2 | 1 | 1 | 1 | 1 | 1 | 1 | 1 | 1 |
| | 10 | 1 | 1 | 1 | 1 | 2 | 1 | 1 | 1–2 |
| | 28 | 1 | 1 | 1 | 1 | 2 | 1 | 1 | 1–2 |
| | 56 | 1 | 1 | 1 | 1 | 2 | 1 | 1 | 1–2 |
| II | 0 | 1 | 1 | 1 | 1 | 1 | 1 | 1 | 2–3 |
| | 2 | 1 | 1 | 1 | 1 | 1 | 1 | 1 | 3 |
| | 10 | 1 | 1 | 1 | 1 | 4 | 1–2 | 1 | 3 |
| | 28 | 1 | 1 | 1 | 1 | 4 | 1–2 | 1 | 3–4 |
| | 56 | 1 | 1 | 1 | 1 | 5 | 2 | 1 | 4 |
| Comp 1 | 0 | 1 | 1 | 1 | 1 | 1 | 1 | 1 | 1–2 |
| | 2 | 1 | 1 | 1 | 1 | 1 | 1 | 1 | 2 |
| | 10 | 1 | 3 | 1 | 1 | 4–5 | 3 | 1 | 2 |
| | 28 | 1 | 3 | 1 | 2 | 5 | 3 | 1 | 2–3 |
| | 56 | 1 | 3 | 1 | 2 | 5 | 4 | 1 | 2–3 |

EXAMPLE 16

The coating composition II according to Example 12 is drawn out directly after its preparation, using a glass rod, onto 65 g/m² parchment paper to give a weight per unit area of about 4 g/m². Subsequently, directly after coating, the coated paper is irradiated in a UV apparatus for different periods and is assessed by means of the finger stripe test. In the course of irradiation the coated paper heats up to about 85° C. The results are given in Table 5.

COMPARISON EXAMPLE 5

The procedure described in Example 16 is repeated with the modification that, instead of the coating composition II, the coating composition Comp1 from Comparison Example 1 is employed. The results are given in Table 5.

TABLE 5

| Coating composition | Irradiation time in seconds | |
|---|---|---|
| | 0.7 | 1.4 |
| | \multicolumn{2}{c}{Finger stripe test} | |
| II | 1–2 | 1 |
| Comp 1 | 2 | 1–2 |

EXAMPLE 17

Preparation of MQ resin powder A:

A 70% strength solution in toluene of an MQ resin consisting of $(CH_3)_3SiO_{1/2}$, $(CH_3)_2(CH_2=CH)SiO_{1/2}$ and $SiO_{4/2}$ units in a molar ratio of 0.70:0.10:1 is used to prepare, by the process described in the initially cited German application with the file reference 19502034.0, a flowable resin powder having a mean particle diameter ($D_{50}$ value) of 155 μm, a bulk density of 460 kg/m³ and a mean toluene content of 0.07%, based on the weight of the resin powder.

The constituents set out below are mixed to prepare a coating composition V: 80 parts of organopolysiloxane according to Example 3 and 20 parts of the above-described MQ resin powder, 0.09 part of ethynylcyclohexanol, a copolymer of trimethylsiloxane, dimethylsiloxane and methylhydridosiloxane units having a viscosity of 25 mm²/s and a content of Si-bonded hydrogen of 1.62% in a quantity such that the molar ratio of the Si-bonded hydrogen atoms to the vinyl groups of the novel organopolysiloxane employed and of the siloxane resin has the value 2, and platinum in the form of a platinum-1,3-divinyl-1,1,3,3-tetramethyldisiloxane complex in a quantity such that the overall mixture has a platinum content of 100 ppm based on elemental platinum.

A coating composition VI is prepared in analogy to the coating composition V but with the modification that, instead of 80 parts of organopolysiloxane according to Example 3, 80 parts of organopolysiloxane according to Example 7 are employed.

The subsequent procedure is as described in Example 12. The results are given in Table 6.

COMPARISON EXAMPLE 6

The procedure described in Example 17 is repeated with the modification that the coating composition employed includes, instead of 80 parts of the organopolysiloxane according to Example 3, 100 parts of a linear copolymer of vinyldimethylsiloxane and dimethylsiloxane units having a viscosity of 195 mm²/s and an iodine number of 6.8 (coating composition Comp3).

The results are given in Table 6.

At the curing time at which the coated papers were assessed with the rating 1 in the finger stripe test, the test for abrasion resistance, which is carried out directly after curing, is also assessed with the rating 1.

TABLE 6

| | Crosslinking temperature [° C.] | | | | | | |
|---|---|---|---|---|---|---|---|
| | \multicolumn{3}{c}{85} | 150 | Residual adhesive force [%] | \multicolumn{3}{c}{Release values [cN/cm]} |
| | \multicolumn{4}{c}{Crosslinking time in seconds} | | \multicolumn{3}{c}{Adhesive} |
| Composition | 12 | 15 | 20 | 4 | | T-4154 | K-7476 | A-7475 |
| V | 2 | 1–2 | 1 | 1 | 115 | 15.8 | 13.1 | 13.6 |
| VI | 1–2 | 1–2 | 1 | 1 | 122 | 24.8 | 21.7 | 13.9 |
| Comp 3 | 2–3 | 1–2 | 1 | 1 | 121 | 17.9 | 20.6 | 13.3 |

EXAMPLE 18

The coating composition VI according to Example 17 is drawn out, directly after its preparation, using a hand doctor blade, onto 65 g/m² glassine paper to give a weight per unit area of about 1.5 g/m².

Subsequently, directly after coating, the coated paper is cured for 5 seconds at 150° C. and, directly after curing, the extractable silicone constituents are determined. The value is 2.9%.

What is claimed is:

1. An organopolysiloxane containing aliphatically unsaturated radicals, which is soluble in organic solvents selected from the group consisting of xylenes and toluene to an extent of at least 80 percent by weight, at a temperature of 25° C. and a pressure of from 900 to 1100 hPa, and comprises at least one unit of the formula $$R^1{}_a R_{2-a} SiO_{2/2} \qquad (I),$$

at least one unit of the formula $$R^1{}_b R_{3-b} SiO_{1/2} \qquad (II),$$

at least one unit of the formula $$O_{1/2}R_2SiO_xYRSiO_{2/2} \quad (III)$$

and, optionally, at least one unit of the formula $$O_{1/2}R_2SiO_xYR_2SiO_{1/2}, \quad (IV)$$

where

R can be identical or different and is a monovalent, substituted or unsubstituted, SiC-bonded, aliphatically saturated hydrocarbon radical, $R^1$ can be identical or different and is a monovalent, SiC-bonded, substituted or unsubstituted, aliphatically unsaturated hydrocarbon radical, a is 0, 1 or 2, b is 0, 1, 2 or 3, x is 0 or 1 and Y is a radical —$(CR^3_2)_n$CHR$^3$— with at least two carbon atoms, where n is 0 or an integer from 1 to 3 and $R^3$ is a hydrogen atom or is as defined for R, with the proviso that the organopolysiloxane includes at least one unit of the formula (II) where b is not 0.

2. An organopolysiloxane as claimed in claim 1, wherein radical $R^1$ is the vinyl radical.

3. An organopolysiloxane is claimed in claim 1, wherein radical Y is —CH$_2$—CH$_2$ or —CH(CH$_3$)—.

4. An organopolysiloxane as claimed in claim 1, which consists of units of the formula (I), (II), (III) and, optionally, (IV).

5. A process for preparing an organopolysiloxane as claimed in claim 1, which comprises reacting linear organosiloxanes A consisting of at least one unit of the formula $$R^4_cR^5_{2-c}SiO_{2/2} \quad (V),$$

and/or at least one unit of the formula $$R^4_dR^5_{3-d}SiO_{1/2}, \quad (VI),$$

where $R^4$ can be identical or different and is as defined for $R^1$, $R^5$ can be identical or different and is as defined for R, c is 0, 1 or 2, and d is 0, 1, 2 or 3, with the proviso that organosiloxanes A possess at least one radical $R^4$ and that there is at least one organosiloxane A having 2 units of the formula (VI) where d is not 0, with linear or cyclic organosiloxane B consisting of at least one unit of the formula $$H_fR^7_gR^6_{3-f-g}SiO_{1/2} \quad (VIII),$$

and/or at least one unit of the formula $$H_eR^6_{2-e}SiO_{2/2} \quad (VII),$$

where $R^6$ can be identical or different and is as defined for R, $R^7$ is as defined for $R^1$, e is 0 or 1, f is 0 or 1, and g is 0, 1, 2 or 3, with the proviso that the sum g+f is less than or equal to 3 and that organosiloxane B has at least one unit of the formula (VII) where e is 1, and, optionally, with hydrocarbons C containing aliphatic carbon-carbon multiple bonds and, optionally, in the presence of inert organic solvent D, in the presence of a catalyst E which promotes the addition of Si-bonded hydrogen onto aliphatic multiple bond, with the proviso that in the unreacted mixture of starting materials the molar ratio of the units of the formula (VI) where d is not 0 to the Si-bonded hydrogen atoms present in the units of the formula (VII) is at least 1.3:1.

6. A crosslinkable organopolysiloxane composition which comprises (1) an organopolysiloxane as claimed in claim 1, (2) one or more organosiloxanes containing Si-bonded hydrogen, (3) one or more catalysts which promote the addition of Si-bonded hydrogen onto aliphatic multiple bond.

7. An organopolysiloxane composition as claimed in claim 6, wherein the organosiloxanes (2) containing Si-bonded hydrogen atoms used are linear, cyclic or branched organopolysiloxanes comprising units of the formula $$R^8_hH_iSiO_{4-h-i/2} \quad (IX)$$

where $R^8$ can be identical or different and is as defined above for R, h is 0, 1, 2 or 3, and i is 0, 1 or 2, with the proviso that the sum of h+i is less than or equal to 3 and that there are on average at least two Si-bonded hydrogen atoms per molecule.

8. An organopolysiloxane composition as claimed in claim 6, wherein siloxane (2) is employed in quantities of from 0.7 to 5 mol of Si-bonded hydrogen, based on 1 mol of aliphatic carbon-carbon multiple bond in the organopolysiloxane (1).

9. An organopolysiloxane composition as claimed in claim 6, which consists of the constituents (1), (2), (3) and, optionally one or more of the following: (4) one or more inhibitors, (5) one or more organopolysiloxane resins, (6) one or more linear organopolysiloxanes containing aliphatic carbon-carbon multiple bonds, (7) one or more hydrocarbons containing aliphatic carbon-carbon multiple bonds, and one or more organic solvents.

10. A crosslinkable organopolysiloxane composition which comprises:

(1) an organopolysiloxane as prepared in claim 5, (2) one or more organosiloxanes containing Si-bonded hydrogen, (3) one or more catalysts which promote the addition of Si-bonded hydrogen onto aliphatic multiple bonds.

11. An organopolysiloxane composition as claimed in claim 10, wherein the organosiloxanes (2) containing Si-bonded hydrogen atoms used are linear, cyclic or branched organopolysiloxanes comprising units of the formula $$R^8_hH_iSiO_{\frac{4-h-i}{2}} \quad (IX)$$

where $R^8$ can be identical or different and is as defined above for R, h is 0, 1, 2 or 3, and i is 0, 1 or 2, with the proviso that the sum of h+i is less than or equal to 3 and that there are on average at least two Si-bonded hydrogen atoms per molecule.

* * * * *

UNITED STATES PATENT AND TRADEMARK OFFICE
CERTIFICATE OF CORRECTION

PATENT NO. : 6,034,225
DATED : March 7, 2000
INVENTOR(S) : Richard Weidner, et. al.

It is certified that error appears in the above-identified patent and that said Letters Patent is hereby corrected as shown below:

Column 22, Line 19, Claim 7: the formula should read

-- $R^8{}_h H_i SiO_{\frac{4-h-i}{2}}$ --.

Signed and Sealed this

Twenty-sixth Day of December, 2000

Attest:

Q. TODD DICKINSON

*Attesting Officer*   *Director of Patents and Trademarks*